R. C. FRAZEE.
CLAMP.
APPLICATION FILED MAY 13, 1913.

1,112,781.

Patented Oct. 6, 1914.

Witnesses
Wm H. Mulligan
Everett Lancaster

Inventor
Ralph C. Frazee,
By Richard Bowen
his Attorney

UNITED STATES PATENT OFFICE.

RALPH C. FRAZEE, OF EAST HAMPTON, NEW YORK.

CLAMP.

1,112,781. Specification of Letters Patent. Patented Oct. 6, 1914.

Application filed May 13, 1913. Serial No. 767,390.

*To all whom it may concern:*

Be it known that I, RALPH C. FRAZEE, a citizen of the United States, residing at East Hampton, in the county of Suffolk and State of New York, have invented certain new and useful Improvements in Clamps, of which the following is a specification.

My present invention relates to clamps whereby two conduits may be joined for the purpose of conveying fluid and relates more particularly to that class of clamps which are adjustable.

The principal object of my invention is to provide a clamp of the character described which is susceptible of use for joining two conduits having different external diameters, such as the connection of a radiator in an automobile, with the jacketing of the engine.

A further object of my invention is to provide an adjustable clamp so that it may be made to conform to substantially the external surface of one of the conduits at the joint. By providing a clamp of this character, and more particularly for use as hereinbefore mentioned, it is not necessary for a repair man to carry in stock a number of clamps, according to the designs of radiators now in common use, but one type of clamp will serve for practically any radiator.

Another object of my invention is to provide retaining portions on one of the parts of a two part clamp so disposed that they will in no way injure the conduits held by the clamp and will enable the parts to be drawn tightly together for the purpose of providing a substantially fluid tight joint between the conduits.

Figure 1:
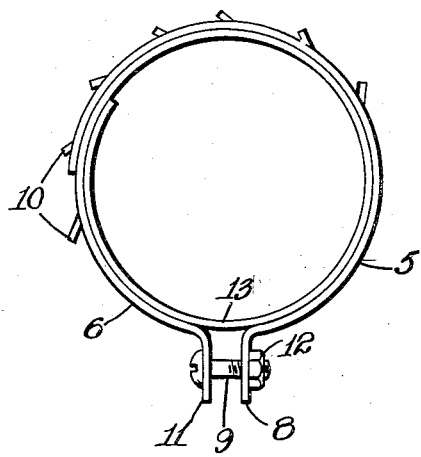
Figure 2:
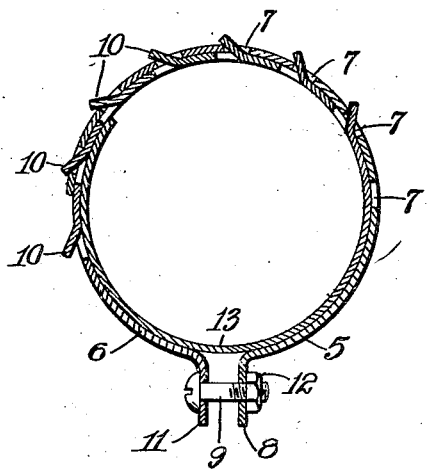
Figure 3:
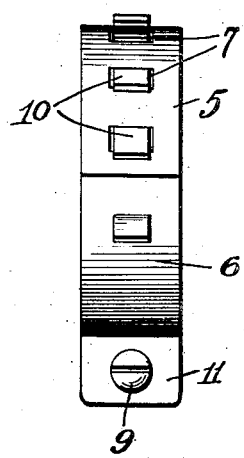
Figure 4:
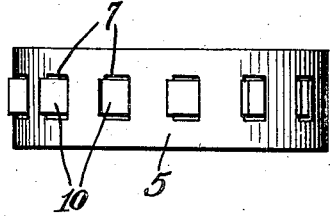

Other objects of the invention will appear in the following detail description taken in connection with the accompanying drawings forming a part of the specification, and in which drawing:

Figure 1 is a front elevation of a clamp constructed according to my invention; Fig. 2 is a central vertical section through the same; Fig. 3 is an end elevation of the clamp; and Fig. 4 is a top plan view of the same.

In the drawings, where similar characters refer to similar parts, 5 designates an arcuate clamp member in the form of a band and 6, a coacting spiral shaped clamp member in the form of a band. The latter, in use, is adapted to lie within the internal periphery of the arcuate clamp member and is resilient so that its diameter may be increased or diminished as desired.

The clamp member 5 has a plurality of apertures 7 spaced apart from each other longitudinally of itself and also, an offset portion 8 through which may pass a portion of a retaining member such as the bolt 9. The spiral shaped clamp member 6 is provided with a plurality of outwardly struck tangential portions 10 so disposed as to extend through the said aperture 7 when the two members are assembled in operative position to each other. This clamp member 6 also carries an offset portion 11, similar to portion 8, also accommodating a portion of the retaining member 9.

While I have shown the bolt 9, together with a nut 12 for holding the clamp members one rigid with the other, any other suitable device may be substituted therefor without departing from the spirit or scope of my invention.

It is to be noted that, inasmuch as the member 6 is spiral in shape, it includes a metallic spanning portion 13 adjacent the offset portions 8 and 11 so that if the outer conduit joined, is of a yieldable character, it will not interfere with the tightening of the clamp members in order that they may serve their purpose to provide a substantially fluid tight joint. Furthermore, the clamp members may be struck from a sheet of metal and bent to coact as hereinbefore described. The tangential struck portions 10 provide a wedge-shaped recess for that portion of the clamp member 5 intermediate the apertures 7 and enable the clamp members to be brought tightly in engagement with each other so as to bend one conduit over another.

In practice, the clamp member 6 is first disposed about the conduit and turned upon itself so as so tightly embrace the conduit. The second clamp member 5 is then disposed with its apertures receiving certain of the outwardly struck portions 10, according to the diameter of the conduit, and the bolt 9 is then passed through the apertures in offset portions 8 and 13 and the nut 12 turned tight. This provides a clamp which will retain the conduits in substantially fluid tight engagement and is well adapted for use in connection with the conduits joining a radiator with the packeting of an engine used on automobiles, and which are subjected to much vibration.

I claim:—

A clamp for general circular objects comprising a clamping strip of metal having one end bent to form a terminal clamping lug and extending from said lug circumferentially more than one wind with its remaining end lapped beneath and extending past said clamping lug, said strip being provided with locking lugs remote from said clamping lug, a relatively short clamping strip of metal having openings formed therein coactive with said lugs upon said first named strip and having its end remote from said openings bent to form a clamping lug and disposed abreast of said first named clamping lug and on said underlapped portion.

In testimony whereof I affix my signature in presence of two witnesses.

RALPH C. FRAZEE.

Witnesses:
JOSEPH C. BURNS,
GEORGE N. SMITH.